United States Patent
Enders et al.

(10) Patent No.: US 7,367,702 B2
(45) Date of Patent: May 6, 2008

(54) HEADLIGHT

(75) Inventors: Martin Enders, Munich (DE); Helmut Erdl, Vogtareuth (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/386,786

(22) Filed: Mar. 23, 2006

(65) Prior Publication Data
US 2006/0227568 A1    Oct. 12, 2006

Related U.S. Application Data

(63) Continuation of application No. PCT/EP2004/007299, filed on Jul. 3, 2004.

(30) Foreign Application Priority Data
Sep. 24, 2003 (DE) ................. 103 44 130

(51) Int. Cl.
F21V 9/00    (2006.01)
(52) U.S. Cl. ...................... 362/511; 362/507
(58) Field of Classification Search .............. 362/403, 362/418–419, 427–428, 285, 288, 511, 507, 362/581, 556, 551
See application file for complete search history.

(56) References Cited

U.S. PATENT DOCUMENTS 4,479,699 A * 10/1984 Bolte .................. 359/525
5,058,985 A * 10/1991 Davenport et al. .......... 385/115
6,186,650 B1 * 2/2001 Hulse et al. ................ 362/511
6,193,400 B1    2/2001 Schuster et al.
6,635,012 B2 * 10/2003 Ayame et al. .............. 600/178
2003/0174509 A1    9/2003 Futami

FOREIGN PATENT DOCUMENTS

| DE | 196 52 159 A1 | 6/1998 |
| DE | 100 40 302 A1 | 2/2002 |
| DE | 101 15 868 A1 | 10/2002 |
| DE | 102 05 694 A1 | 9/2003 |
| EP | 0 509 679 A2 | 10/1992 |

(Continued)

OTHER PUBLICATIONS

International Search Report dated Nov. 12, 2004 including an English translation of the pertinent portion (four (4) pages).

(Continued)

Primary Examiner—Jong-Suk (James) Lee
Assistant Examiner—Julie A. Shallenberger
(74) Attorney, Agent, or Firm—Crowell & Moring LLP

(57) ABSTRACT

A headlight, especially a headlight for a vehicle, includes a light source with a reflector in front thereof and a fiber-optic light guide which is embodied as an elongated light decoupling element, which is at least partially adjacent to one end of the reflector. A light exiting surface faces away from the reflector. The inner side of the reflector facing towards the light source is at least partially embodied in such a way that it forms a first focal point in the position of the light source and reflects light radiated from the light source to an incident light surface of the light decoupling element facing way from the light exiting surface.

20 Claims, 4 Drawing Sheets

FOREIGN PATENT DOCUMENTS

| | | |
|---|---|---|
| EP | 0 900 694 A2 | 3/1999 |
| EP | 0 950 847 A2 | 10/1999 |
| EP | 1 243 467 A2 | 9/2002 |
| EP | 1 302 719 A1 | 4/2003 |
| JP | 2002-293189 A | 10/2002 |
| WO | WO 94/03829 A1 | 2/1994 |
| WO | WO 03/070512 A1 | 8/2003 |

OTHER PUBLICATIONS

German Search Report dated Jul. 29, 2004 including an English translation of the pertinent portion (four (4) pages).

* cited by examiner

HEADLIGHT

CROSS-REFERENCE TO RELATED APPLICATIONS

This application is a continuation of PCT Application No. PCT/EP2004/007299 filed on Jul. 3, 2004, which claims priority to German Application No. 103 44 130.1 filed Sep. 24, 2003, the disclosures of which are incorporated by reference herein.

BACKGROUND AND SUMMARY OF THE INVENTION

The invention relates to a headlight, particularly a vehicle headlight, having a light source disposed in front of a reflector, and having a fiber-optic waveguide. As an elongated light decoupling element which, at least in areas, is adjacent to an edge of the reflector, the waveguide is constructed with a light exiting surface facing away from the reflector.

From European Patent document EP 0 900 694 A2 and from German Patent Document DE 100 40 302 A1, vehicle headlights are known, which have a light source for generating the light of a headlight. For example, FIG. 6 shows a front perspective view of a set of headlights as might appear on one side of the front of a vehicle, and FIG. 7 shows a front perspective view of a single headlight with a reflector and a light source in the center. The light source is disposed in front of a reflector. The known headlights have a fiber-optic waveguide which, as an elongated light decoupling element, is adjacent, at least in areas, to an edge of the reflector.

In the case of the known vehicle headlights, a light source disposed in front of the reflector generates the light of a headlight, such as daytime driving light or low-beam light or high-beam light. By way of a second light source, light is coupled into the fiber-optic waveguide, which light is emitted or decoupled as a signaling light.

As a result of the coupling-in by way of the faces of the fiber-optic waveguide or by way of special coupling-in elements, relatively high losses of light occur so that, although the fiber-optic waveguide is suitable for generating a signalling light, the emitted light does not have a sufficient intensity for a use as a daytime driving light or a low-beam light, and has a relatively inhomogeneous and undesirable light intensity distribution. While a relatively undirected light distribution is not necessarily a disadvantage for a signalling light, relatively high demands are made on the light of a headlight, for example, a low-beam light or daytime driving light, with respect to a homogeneous luminance and a directed light distribution.

It is therefore an object of the present invention to improve the known headlights with the decoupling of light by way of an elongated fiber-optic waveguide such that a homogenous luminance of a high light intensity with a formable or directed light distribution is permitted, as required, for example, for generating a daytime driving light.

This object is achieved according to the invention by providing a headlight, particularly a vehicle headlight, having a light source disposed in front of a reflector, and having a fiber-optic waveguide which, as an elongated light decoupling element which, at least in areas, is adjacent to an edge of the reflector, is constructed with a light exiting surface facing away from the reflector. The interior side of the reflector facing the light source is, at least in areas, constructed such that it forms a first focal point at the site of the light source and reflects light emitted from the light source to a light entering surface of the light decoupling element, which light entering surface faces away from the light exiting surface.

The light of the light source is guided from the reflector to the light entering surface of the fiber-optic waveguide or the light decoupling element, so that the fiber-optic waveguide is virtually transilluminated along its entire length. The relatively high optical losses as a result of the coupling-in, the propagation, and the deflection, are thereby virtually eliminated or are considerably reduced. In addition, as a result of the uniform light distribution on the back side or the light entering surface of the fiber-optic waveguide, a reduction of the light intensity because of a temperature-limited coupling-in is avoided. Thus, a high light intensity can be achieved with a formable and homogeneous light distribution. This achieves the high efficiency which is important for the daytime driving light or the low beam light or the high beam light.

According to a preferred embodiment of the invention, the interior side of the reflector is constructed as a section of a rotational solid whose contour is a result of a rotation about a headlight axis of an ellipse set in the beaming direction with respect to a headlight axis at an angle of less than 90°, whose first focal point F1 is arranged at the site of the light source and whose second focal point F2 is arranged adjacent to the light entering surface of the light decoupling element and, because of the rotation, forms a ring-shaped focal line. In this case, the fiber-optic waveguide expediently has a ring-shaped construction.

Thus, all light of the light source or of the reflector is guided in a targeted manner to the light entering surface of the fiber-optic waveguide. By way of the light entering surface, the light can couple into the fiber-optic waveguide and, in a correspondingly directed manner, can exit again from the light exiting surface. This contributes to a further increase of the efficiency of the headlight. By a corresponding selection of its surfaces—as optical surfaces—, the fiber-optic waveguide may be used for the further modification of the light distribution.

According to another preferred embodiment of the invention, the fiber-optic waveguide has a light coupling-in point with a second light source on the input side, for the reflecting-in of light.

When the daytime driving light is switched off, the fiber-optic waveguide can, therefore, be used as signalling light in a manner known per se. As a result, a dual function of the headlight may be achieved in a simple manner.

According to another preferred embodiment of the invention, the fiber-optic waveguide is constructed as a first light decoupling element, which changes into a second light decoupling element of an adjacent headlight. In this case, the light decoupling element is constructed such that a portion of the light coupled into the first light decoupling element may be decoupled by way of the second light decoupling element. A second light decoupling element of an adjacent headlight can thereby be supplied with a light current by way of the first light decoupling element.

According to another embodiment of the invention, the light emitted by the fiber-optic waveguide may be used as a parking light or position light by dimming the light source. As a result of the dimming, a dual function of the headlight may therefore also be achieved in a simple manner.

According to another preferred embodiment of the invention, the area enclosed by the fiber-optic waveguide may be used for additional light functions. By means of the utilization of the central area, another light function can be achieved in a space-saving manner.

According to another preferred embodiment of the invention, the light source has a first light element, such as a helix or a filament as part of the light element, at the first focal point, for generating the light to be coupled into the fiber-optic waveguide, and a second light element, also such as a helix or a filament as part of the light element disposed in front of the first light element in the beaming direction, for generating light for another light function. In this case, a lens for the additional light function can be arranged in the area enclosed by the fiber-optic waveguide. The light of the second light element can be beamed directly into the lens. The use of a light source with two light elements results in an additional cost reduction and simplifies the lamp exchange. The reflector construction can thereby also be simplified. If required, it is also contemplated to shield the second light element toward the reflector or toward the first light element, or to arrange two separate light sources or lamps behind one another which, if required, are fastened on a common lamp carrier. As a result, special lamps would be avoided.

According to another preferred embodiment of the invention, the lens is constructed and/or arranged with respect to the second light element such that it generates a laterally deflected cornering light. Particularly when the lens axis is offset with respect to the headlight axis and/or contains prisms on the lens surface, a superimposable cornering light/turn light can be generated in a simple and cost-effective manner.

Other objects, advantages and novel features of the present invention will become apparent from the following detailed description of the invention when considered in conjunction with the accompanying drawings.

DETAILED DESCRIPTION OF THE DRAWINGS

Figure 1:
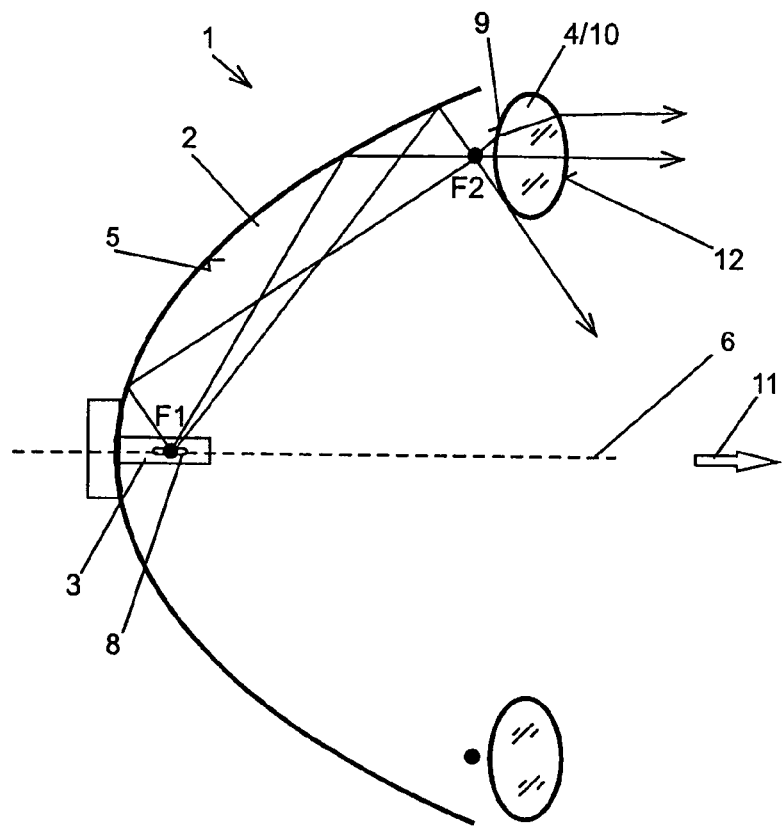
FIG. 1 is a lateral sectional view of a headlight with an emission by way of a fiber-optic waveguide element disposed in front of the reflector.
Figure 2:
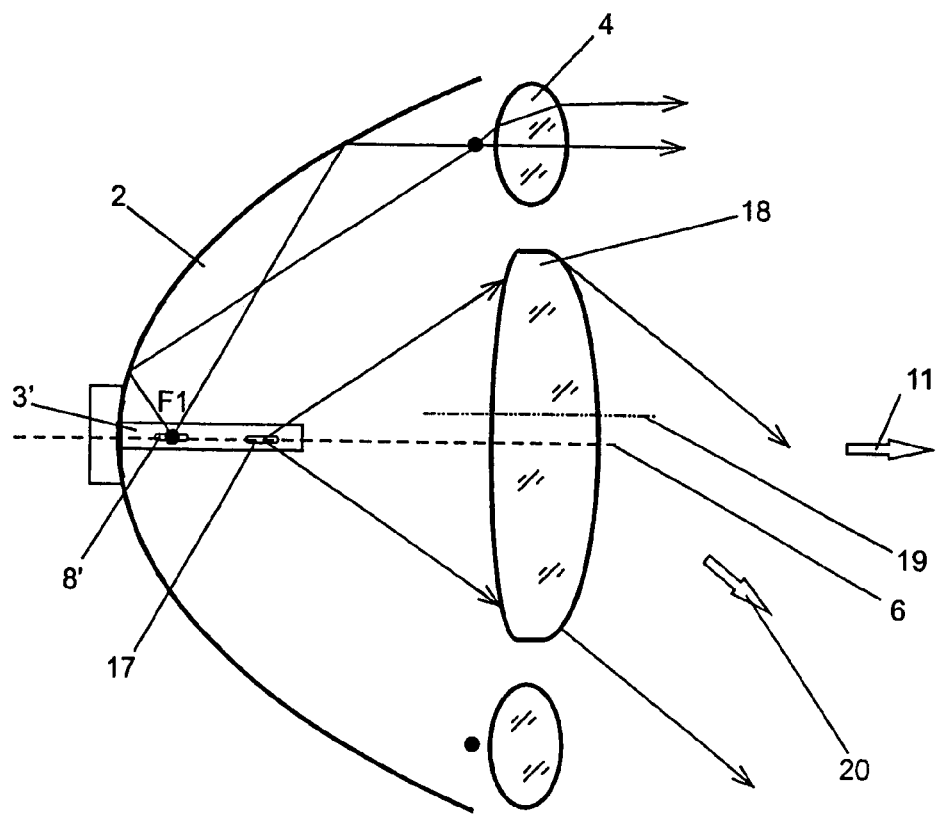
FIG. 2 is a top sectional view of a headlight with a light emission by way of a fiber-optic waveguide element and a light emission in a second helix by way of a lens for generating a cornering light.

Referring to the FIGS. 1 and 2, a headlight 1 consists essentially of a reflector 2, a light source 3 and a fiber-optic waveguide 4.

Figure 3:
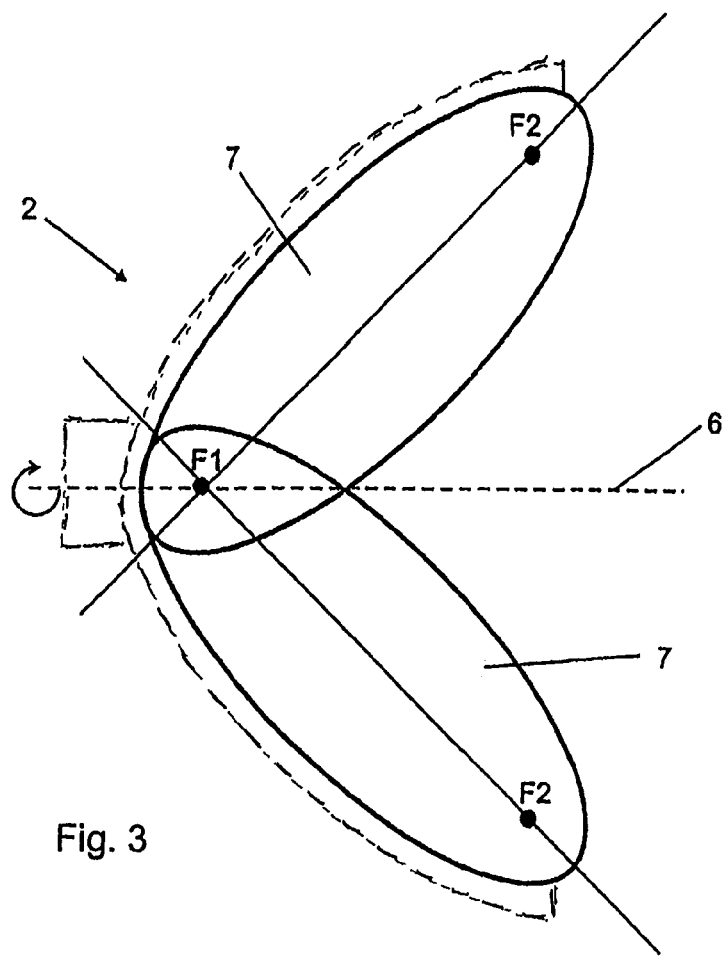
FIG. 3 is a lateral sectional view for the construction of the reflector as an elliptical rotational solid.

The reflector 2 has an interior side 5, which is constructed as a section of a rotational solid whose contour is the result of a rotation about a headlight axis 6 of an ellipse 7 (see FIG. 3). In this case, the ellipse 7 is set at an angle α which is smaller than 90°. The first focal point F1 is arranged at the site of the light source 3 or its helix 8. The second focal point F2 of the ellipse 7 is adjacent to a light entering surface 9 of the fiber-optic waveguide 4 and, as a result of the rotation of the ellipse, forms a ring-shaped focal line.

The fiber-optic waveguide 4 is constructed as an elongated ring-shaped light decoupling element, which is disposed in front of the reflector 2 in a light beaming direction 11. The light decoupling element 10 has the light entering surface 9 in the direction of the reflector 2 and has a light exiting surface 12 on its side facing away from the light entering surface 9. The light decoupling element 10 may have a lenticular contour in its cross-section with an optically effective microstructure on its surface.

The light originating from the light source 3 in the focal point F1 of the reflector 2 is collected by the reflector in focal point F2 or in the focal line, is coupled by way of the light entering surface 9 into the light decoupling element, and is decoupled in a directed manner by way of its light exiting surface 12. As a result, the light emitted by the fiber-optic waveguide 4 or the light decoupling element 10 can be used as daytime driving light. By means of dimming the light source 3, the light emitted by the fiber-optic waveguide 4 may also be used as a parking light or position light.

Figure 4:
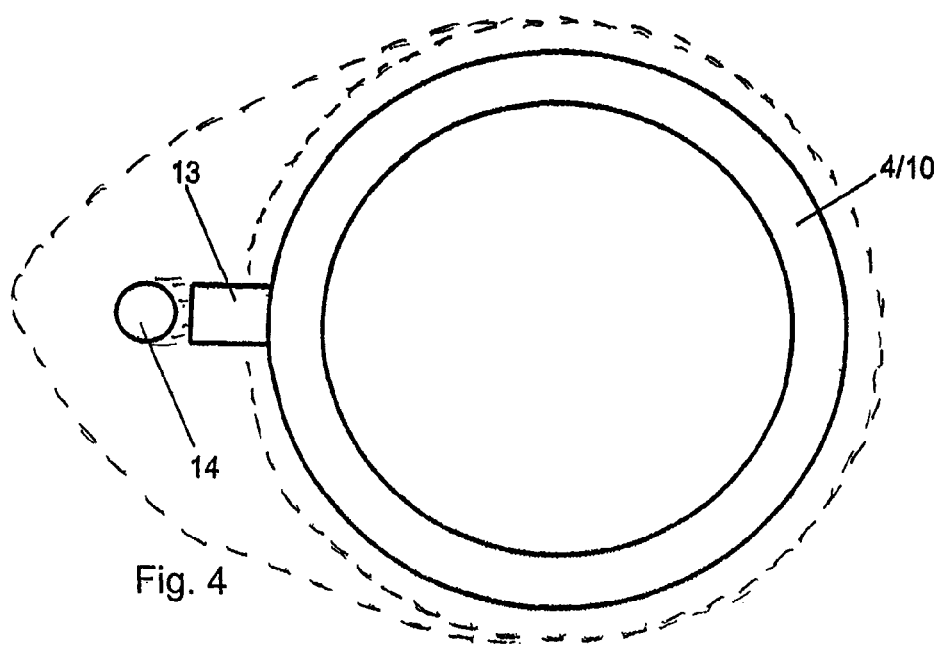
FIG. 4 is a front view of the fiber-optic waveguide of FIG. 1.

The fiber-optic waveguide 4 may also have a lateral light coupling-in element 13 by way of which the light of a second light source 14 disposed in front of the light coupling-in element 13 is reflected-in for generating a parking or position light when the light source 3 is switched off (see FIG. 4).

Figure 5:
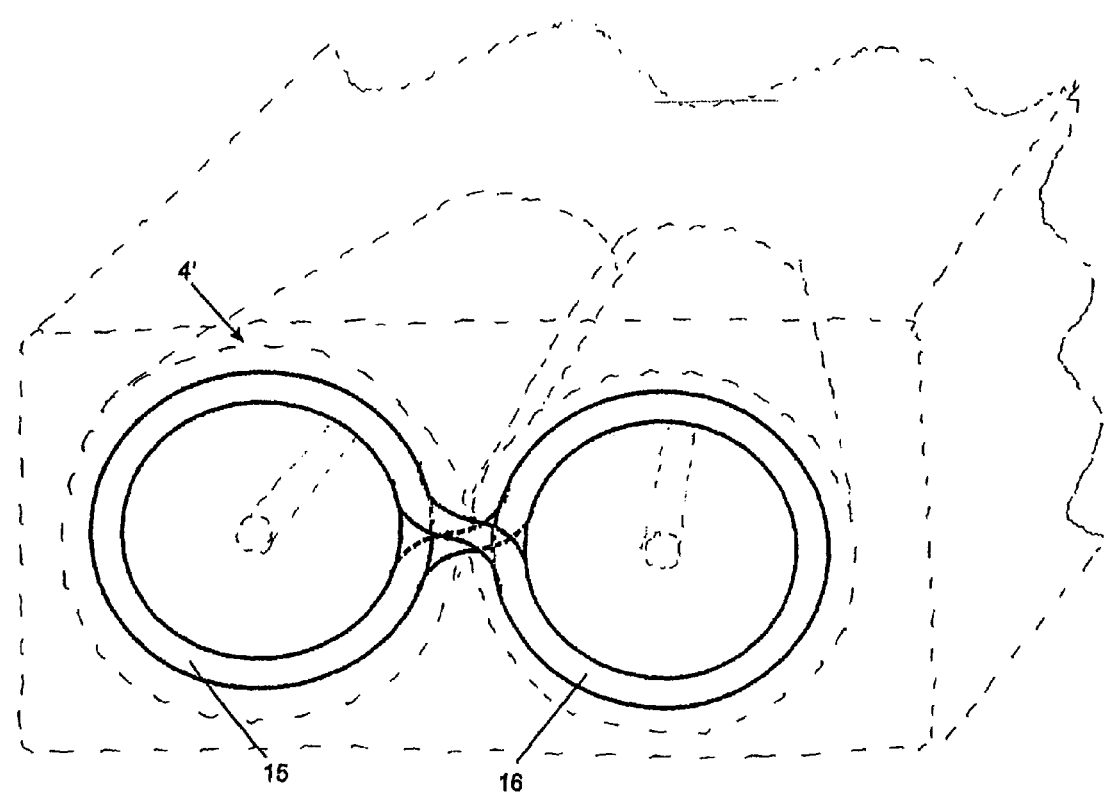
FIG. 5 is a front view of two connected fiber-optic waveguides of an adjacent pair of headlights.
Figure 6:
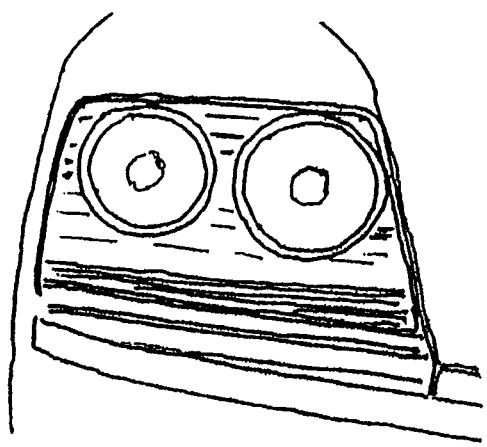
FIG. 6 is a fornt perspective view of a seet of headlights as might appear an one side of the front of as vehichle.
Figure 7:
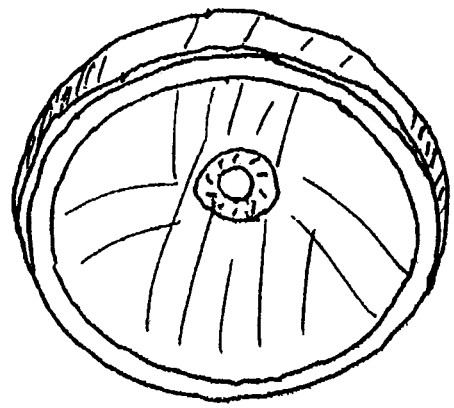
FIG. 7 is a front perspective view of a single of headlight having a reflector and a light source in the center.

For the reflecting of parking or position light into the fiber-optic waveguide 4' of an adjacent second headlight, the fiber-optic waveguide 4 is constructed as a first light decoupling element 15, which changes into a second light decoupling element 16 of the fiber-optic waveguide 4' (see FIG. 5). In other words, by connecting fiber-optic waveguide 4 with a neighboring fiber optic waveguide 4' by means of a connecting light channeling section (which could be a continuation of the fiber optic waveguide so to form a fiber optic waveguide section), light is coupled between a fiber optic waveguide and a neighboring fiber optic waveguide so to allow light to flow between the two. In this way each fiber optic waveguide (4,4') serves also as a decoupling element of at least a part of its light into the other, thus fiber-optic waveguide 4 provides also a light decoupling element 16 and, likewise, neighboring fiber-optic waveguide 4' provides also a light decoupling element 15. As a result of the open light flow connection segment between waveguides 4 and 4', a portion of the light coupled into the first light decoupling element 15 is decoupled by way of the second light decoupling element 16 of the fiber-optic waveguide 4'.

According to another embodiment, the area enclosed by the fiber-optic waveguide 4 is used for additional light functions. Corresponding to FIG. 2, the light source 3' has a first light element 8' whose light is fed to the fiber-optic waveguide 4 by way of the reflector 2. Furthermore, the light source 3' has a second light element 17 which is disposed in front of the first light element 8' in the light beaming direction 11 and whose light is guided directly to a lens 18 and is emitted by way of the latter. The lens 18 is offset with its optical axis 19 with respect to the headlight axis such that it emits the beamed-in light into a lateral light beaming direction 20 as a cornering light.

In the case of a corresponding construction and arrangement of the lens 18, the second helix 17 can also be used for other light functions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A headlight for a vehicle, comprising:
   a reflector;
   a light source disposed in front of an interior side of the reflector on a longitudinal headlight axis;
   a fiber-optic waveguide operatively configured as an elongated light decoupling element comprising a light entering surface facing the reflector and a light exiting surface facing away from the reflector with a surface of the light decoupling element arranged adjacent to an edge of the reflector,
   wherein the interior side of the reflector is operatively configured to form a first focal point at a site of the light source so to reflect light emitted by the light source to the light entering surface of the light decoupling element, and a second focal point adjacent to the light entering surface of the light decoupling element such that the second focal point comprises an elongated focal line.

2. The headlight according to claim 1, wherein the interior side of the reflector is operatively configured to have a surface contour defined by an ellipse having a longitudinal axis, extending through the first and second focal points, set at an angle of less than 90° to the headlight axis and rotated about the headlight axis.

3. The headlight according to claim 1, wherein the fiber-optic waveguide has a ring-shaped construction.

4. The headlight according to claim 2, wherein the fiber-optic waveguide has a ring-shaped construction.

5. The headlight according to claim 1, further comprising a second light source and a light coupling-in element cooperatively positioned with the fiber-optic waveguide to couple-in to the fiber-optic waveguide reflective light from the second light source.

6. The headlight according to claim 2, further comprising a second light source and a light coupling-in element cooperatively positioned with the fiber-optic waveguide to couple-in to the fiber-optic waveguide reflective light from the second light source.

7. The headlight according to claim 3, further comprising a second light source and a light coupling-in element cooperatively positioned with the fiber-optic waveguide to couple-in to the fiber-optic waveguide reflective light from the second light source.

8. The headlight according to claim 1, wherein the fiber-optic waveguide comprises a decoupling element for coupling light directly and independent of any intervening apparatus from the fiber-optic waveguide into a neighboring fiber-optic waveguide of an adjacent headlight.

9. The headlight according to claim 8, wherein the neighboring fiber-optic waveguide comprises a neighboring decoupling element for coupling light directly and independent of any intervening apparatus from the neighboring fiber-optic waveguide into the fiber-optic waveguide.

10. The headlight according to claim 8, wherein at least a portion of the light coupled into the decoupling element is coupled out of the neighboring fiber-optic waveguide by the neighboring decoupling element.

11. The headlight according to claim 9, wherein at least a portion of the light coupled into the decoupling element is coupled out of the neighboring fiber-optic waveguide by the neighboring decoupling element.

12. The headlight according to claim 1, wherein the fiber-optic waveguide is configured for use as a daytime driving light.

13. The headlight according to claim 1, wherein light emitted by the fiber-optic waveguide is used as one from the group of a parking light and a position light, by dimming the light source.

14. The headlight according to claim 1, wherein an area enclosed by the fiber-optic waveguide is used for an additional light function.

15. The headlight according to claim 14, wherein at the first focal point the light source comprises a first light element for generating light to be coupled into the fiber-optic waveguide, and a second light element disposed in front of the first light element in the beaming direction and beyond the first focal point for generating light for said additional light function.

16. The headlight according to claim 14, further comprising a lens for said additional light function, the lens being arranged in the area enclosed by the fiber-optic waveguide.

17. The headlight according to claim 15, further comprising a lens for said additional light function, the lens being arranged in the area enclosed by the fiber-optic waveguide.

18. The headlight according to claim 15, wherein light of the second light element is beamed directly into the lens.

19. The headlight according to claim 17, wherein the lens is operatively configured with respect to the second light element such that it generates a laterally deflected cornering light.

20. The headlight according to claim 9 wherein the decoupling element and the neighboring decoupling element comprise a single light coupling section connecting the fiber-optic waveguide and the neighboring fiber-optic waveguide.

* * * * *